United States Patent
Kojima et al.

(10) Patent No.: US 8,997,801 B2
(45) Date of Patent: Apr. 7, 2015

(54) PUNCTURE REPAIR KIT

(75) Inventors: Yoshihide Kojima, Kobe (JP); Wen San Chou, Tainan Hsien (TW); Yasuhiro Ito, Hyogo (JP)

(73) Assignees: Sumitomo Rubber Industries, Ltd., Kobe (JP); Unik World Ind. Co., Ltd., Tainan (TW)

( * ) Notice: Subject to any disclaimer, the term of this patent is extended or adjusted under 35 U.S.C. 154(b) by 412 days.

(21) Appl. No.: 13/505,883

(22) PCT Filed: Oct. 20, 2010

(86) PCT No.: PCT/JP2010/068451
§ 371 (c)(1),
(2), (4) Date: Sep. 17, 2012

(87) PCT Pub. No.: WO2011/055632
PCT Pub. Date: May 12, 2011

(65) Prior Publication Data
US 2013/0000777 A1    Jan. 3, 2013

(30) Foreign Application Priority Data

Nov. 4, 2009 (JP) ................................. 2009-253258
Nov. 4, 2009 (JP) ................................. 2009-253262

(51) Int. Cl.
*B29C 73/16* (2006.01)
*B60S 5/04* (2006.01)
(Continued)

(52) U.S. Cl.
CPC .............. *B29C 73/166* (2013.01); *B29C 73/025* (2013.01); *B29L 2030/00* (2013.01); *B60S 5/04* (2013.01)

(58) Field of Classification Search
CPC ......... B60S 5/04; B29C 73/025; B29C 73/16; B29C 73/163; B29C 73/166

USPC ............................................. 141/38; 152/415
See application file for complete search history.

(56) References Cited

U.S. PATENT DOCUMENTS 6,283,172 B1 * 9/2001 Thurner ........................ 141/38
6,789,581 B2 * 9/2004 Cowan et al. .................. 141/38
(Continued)

FOREIGN PATENT DOCUMENTS

DE   10 2004 060 662 A1   7/2006
DE   20 2007 016 242 U1   3/2008
(Continued)

OTHER PUBLICATIONS

International Search Report issued in PCT/JP2011/068451 dated Nov. 22, 2010.
(Continued)

*Primary Examiner* — Nicolas A Arnett
(74) *Attorney, Agent, or Firm* — Birch, Stewart, Kolasch & Birch, LLP

(57) ABSTRACT

Disclosed is a puncture repair kit in which a bottle unit is positioned with greater stability. A puncture repair kit (1) comprises a compressor device (2), and a bottle unit (3) in which a cap (6) is attached to an opening (5) in a bottle container (4) which houses a puncture sealing agent. The compressor device (2) comprises a compressed air discharge port (8). The cap (6) comprises an air intake port (27) for feeding compressed air from the compressed air discharge port (8) into the bottle container (4), and a sealing agent/compressed air removal port (7) for removing puncture sealing agent and compressed air in succession from the bottle container (4) by feeding in compressed air. The compressed air discharge port (8) and the air intake port (27) can be directly connected.

6 Claims, 20 Drawing Sheets

(51) Int. Cl.
  *B29C 73/02* (2006.01)
  *B29L 30/00* (2006.01)

(56) References Cited

U.S. PATENT DOCUMENTS

| | | | |
|---|---|---|---|
| 6,964,284 B2 * | 11/2005 | Eckhardt | 141/38 |
| 7,798,183 B2 * | 9/2010 | Cegelski et al. | 141/38 |
| 8,146,622 B2 * | 4/2012 | Guan et al. | 141/38 |
| 8,251,105 B2 * | 8/2012 | Lolli et al. | 141/38 |
| 8,276,624 B2 * | 10/2012 | Steele et al. | 141/38 |
| 8,297,321 B2 * | 10/2012 | Chou | 141/38 |
| 8,297,944 B2 * | 10/2012 | Chou | 417/313 |
| 8,302,636 B2 * | 11/2012 | Sekiguchi | 141/38 |
| 8,342,215 B2 * | 1/2013 | Sekiguchi | 141/329 |
| 8,522,833 B2 * | 9/2013 | Chou | 141/38 |
| 8,627,857 B2 * | 1/2014 | Chou | 141/38 |
| 8,671,995 B2 * | 3/2014 | Chou | 141/38 |
| 8,684,046 B2 * | 4/2014 | Kojima et al. | 141/38 |
| 8,746,293 B2 * | 6/2014 | Chou | 141/38 |
| 2003/0047652 A1 | 3/2003 | Eckhardt | |
| 2004/0159365 A1 * | 8/2004 | Cowan et al. | 141/38 |
| 2005/0265873 A1 * | 12/2005 | Chou | 417/552 |
| 2008/0230142 A1 * | 9/2008 | Hickman | 141/38 |
| 2008/0257448 A1 * | 10/2008 | Hickman et al. | 141/26 |
| 2009/0050232 A1 * | 2/2009 | Guan et al. | 141/38 |
| 2009/0107578 A1 * | 4/2009 | Trachtenberg et al. | 141/38 |
| 2009/0301602 A1 * | 12/2009 | Lolli et al. | 141/38 |
| 2010/0071801 A1 * | 3/2010 | Sekiguchi | 141/38 |
| 2010/0147416 A1 * | 6/2010 | Chou | 141/38 |
| 2010/0189575 A1 | 7/2010 | Yoshida et al. | |
| 2011/0011217 A1 * | 1/2011 | Kojima | 81/15.2 |
| 2011/0192492 A1 * | 8/2011 | Kanenari et al. | 141/38 |
| 2012/0298255 A1 * | 11/2012 | Nakao | 141/38 |
| 2013/0092286 A1 * | 4/2013 | Chou | 141/38 |
| 2013/0199666 A1 * | 8/2013 | Nakao et al. | 141/38 |
| 2013/0284313 A1 * | 10/2013 | Kojima et al. | 141/38 |

FOREIGN PATENT DOCUMENTS

| | | |
|---|---|---|
| EP | 1291158 A1 | 3/2003 |
| EP | 1605162 A2 | 12/2005 |
| EP | 1 605 162 A3 | 11/2006 |
| JP | 2000-108215 A | 4/2000 |
| JP | 2008-896 A | 1/2008 |
| JP | 2008-307861 A | 12/2008 |
| JP | 2009-226891 A | 10/2009 |
| JP | 2009-226892 A | 10/2009 |

OTHER PUBLICATIONS

Extended European Search Report for European Patent Application No. 10828192.4 dated Mar. 28, 2014.

* cited by examiner

PUNCTURE REPAIR KIT

TECHNICAL FIELD

The present invention relates to a puncture repair kit for tire to inject puncture sealing agent and compressed air in succession into a punctured tire and to repair a puncture as an emergency procedure.

BACKGROUND OF THE INVENTION

An example of a puncture repair kit for repairing a puncture as an emergency procedure is the following patent document 1. Into a puncture tire, puncture sealing agent and compressed air are injected in succession, and the punctured tire is pumped up. And then, in this state, owing to roll the tire, the puncture sealing agent covers a whole circumference of a cavity surface of the tire so as to seal the puncture hole as an emergency procedure.

Such a repairing kit, as shown in FIG. 21, comprises a compressor device (a), and a bottle unit (d) comprising a bottle container (b) enclosing puncture sealing agent and a cap (c) attached to an opening of this bottle container (b). The above-mentioned cap (c) comprises an air intake port c1 to intake the compressed air from the above-mentioned compressed air discharge port into the bottle container (b), and a sealing agent/compressed air removal port c2 to remove in succession the puncture sealing agent and the compressed air from the above-mentioned bottle container (b) by sending this compressed air. The above-mentioned air intake port c1 is connected with an air supply hose e1 from the compressor device (a). The sealing agent/compressed air removal port c2 is connected with a second end of a feeding hose e2 of which first end is connected with the air valve of the tire T.

Patent Document 1: Japanese unexamined Patent Application Publication No. 2000-108215

DISCLOSURE OF THE INVENTION

Problems to be Solved by the Invention

This repair kit is necessary to be used in an inverted upright state of a bottle unit (d). However, because a. the bottle unit (d) is a tall, b. in a standpoint from a storage behavior, it is difficult to set the diameter of a basal plane of the cap (c) forming a foot to large enough, and c. a lateral force acts owing to push of the hoses e1 and e2 since the hoses e1 and e2 are connected, it is liable to fall easily off the bottle unit (d) at work. So, it deteriorates a workability of the puncture repairing.

It is an object of the present invention to provide a puncture repair kit capable of improving stability of the bottle unit, preventing a fall of the bottle unit, and improving workability of puncture repairing on a basis of directly connecting a compressed air discharge port of the compressor device with an air intake port of the bottle unit without hose and the like intervention.

Means for Solving the Problem

To solve the above-mentioned problems, the present application discloses in claim 1 a puncture repair kit comprising
a compressor device, and
a bottle unit comprising
  a bottle container enclosing puncture sealing agent and
  a cap attached to an opening of this bottle container.
The above-mentioned compressor device comprises a compressed air discharge port to discharge a compressed air.
The above-mentioned cap comprises
  an air intake port to intake the compressed air from the compressed air discharge port into the bottle container, and
  a sealing agent/compressed air removal port to remove in succession the puncture sealing agent and the compressed air from the bottle container by sending this compressed air.
One of the compressed air discharge port and the air intake port is formed of a connecting nozzle protruding toward the other, and the other is formed of a joint concave portion fit together with the connecting nozzle, so as to directly connect the compressed air discharge port with the air intake port.

Effect of the Invention

In the present embodiment, as above stated, the compressed air discharge port is directly connected with the air intake port without hose and the like intervention. This bottle unit becomes therefore unified with the compressor device so as to have a lower center of gravity point. Moreover, the bottle unit is not connected with any air supply hose from the compressor device, and it becomes not to be affected by the power from the air supply hose. This can improve stability and prevent effectively a fall of the bottle unit. And owing to exclude this air supply hose, it helps with cost-cutting and space-saving.

EXPLANATION OF THE REFERENCE

Figure 1:
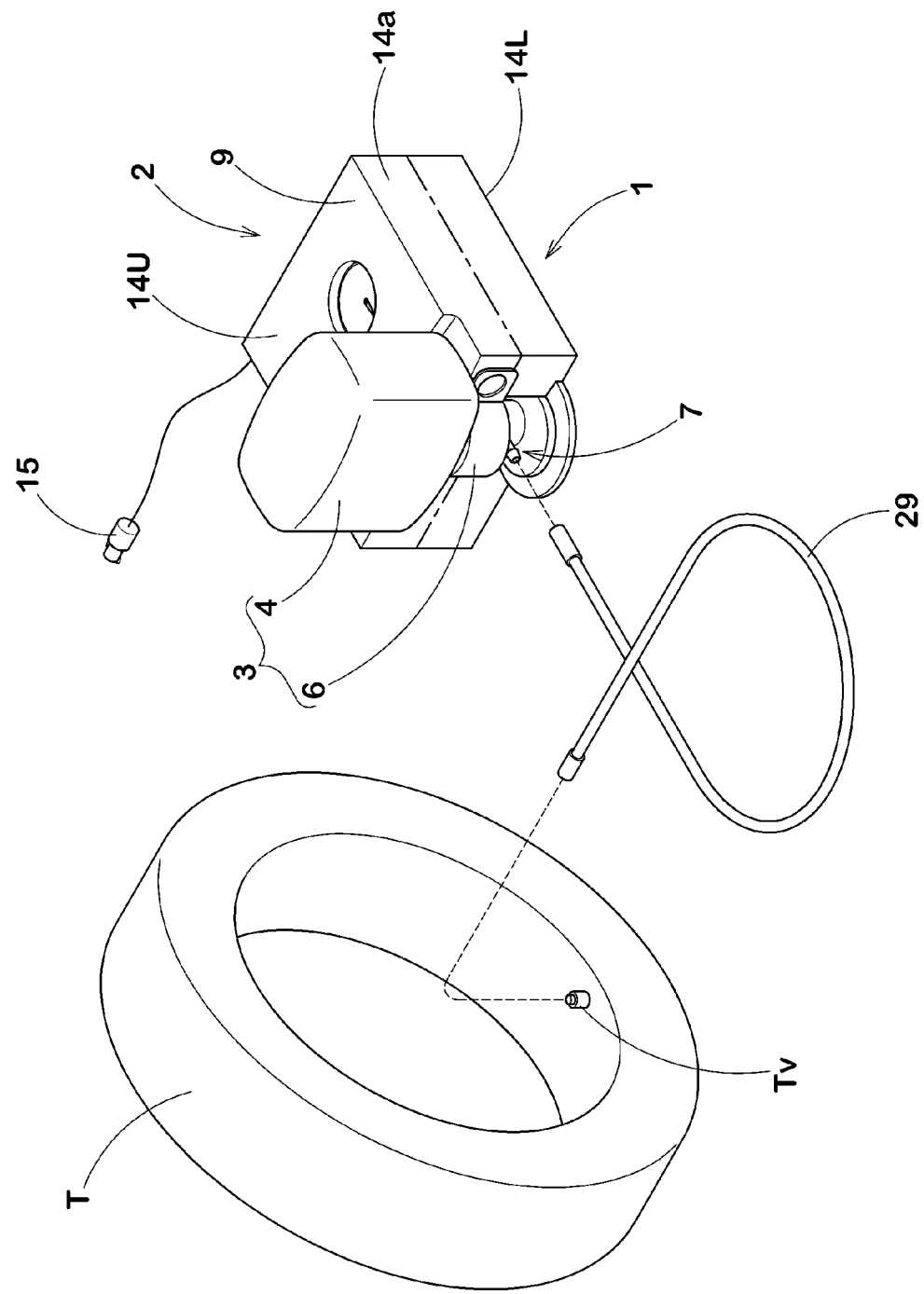
FIG. 1 A perspective view of the present invention using a puncture repair kit for repairing a puncture.

1 Puncture repair kit
2 Compressor device
3 Bottle unit
4 Bottle container
5 Opening
6 Cap
7 Sealing agent/compressed air removal port
8 Compressed air discharge port
9 Housing
10 Piston
11 Pump chamber
12 Cylinder
13 Compressor main body
17 Crank mechanism
25 Cylindrical portion
25H Central hole
27 Air intake port
28 Joint concave portion
41 Connecting nozzle
41B Tapered surface
42 Nozzle receiving surface portion
43 o-shaped ring
45 Locking click
46 Click catching hole
48 Rod-like jig
49 Guide groove
61 Locking plate portion
61H Locking hole
64 Prevent device from falling off
65 Insert concave portion
66 Secured protrusion
67 Sloping surface
i1 shaft center
J Catching part
M Motor
S1 and S2 First and second grove side walls

BEST MODE FOR CARRYING OUT THE INVENTION

Hereinafter, preferred embodiments of the present invention will be concretely described.

As shown in FIG. 1, the puncture repair kit 1 of the first embodiment comprises a compressor device 2 and a bottle unit 3. The bottle unit 3 comprises a bottle container 4 containing puncture sealing agent and a cap 6 attached to its opening 5 (shown in FIG. 8). Thus, the compressor device 2 and the bottle unit 3 are directly connected without any hoses intervention at a scene of fixing a puncture. A sealing agent/compressed air removal port 7 is disposed in the bottle unit 3. One end of a feeding hose 29 is connected with an air valve Tv of the tire T; the other end thereof is connected to the sealing agent/compressed air removal port 7.

Figure 2:
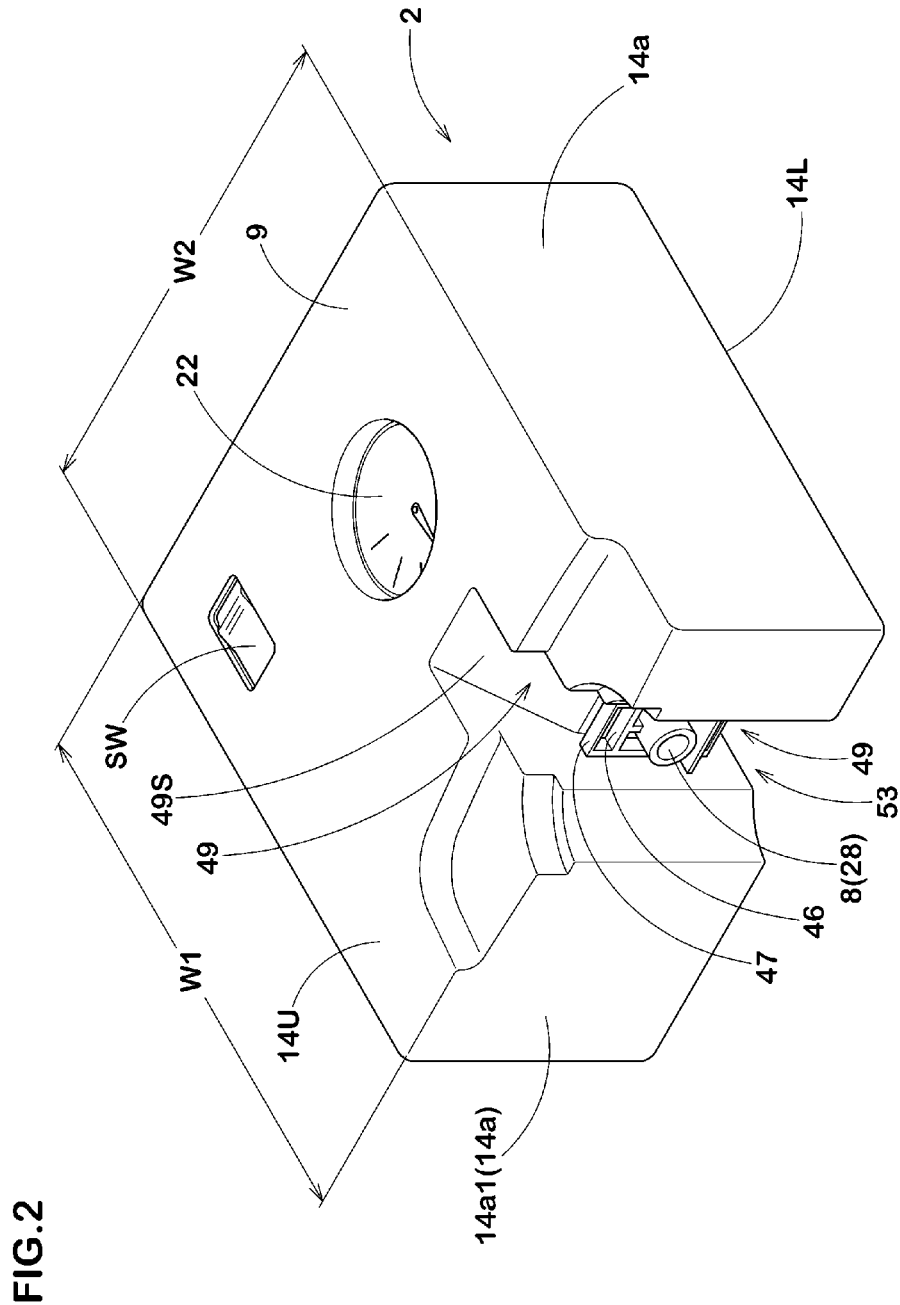
FIG. 2 A perspective view showing a compressor device.
Figure 3:
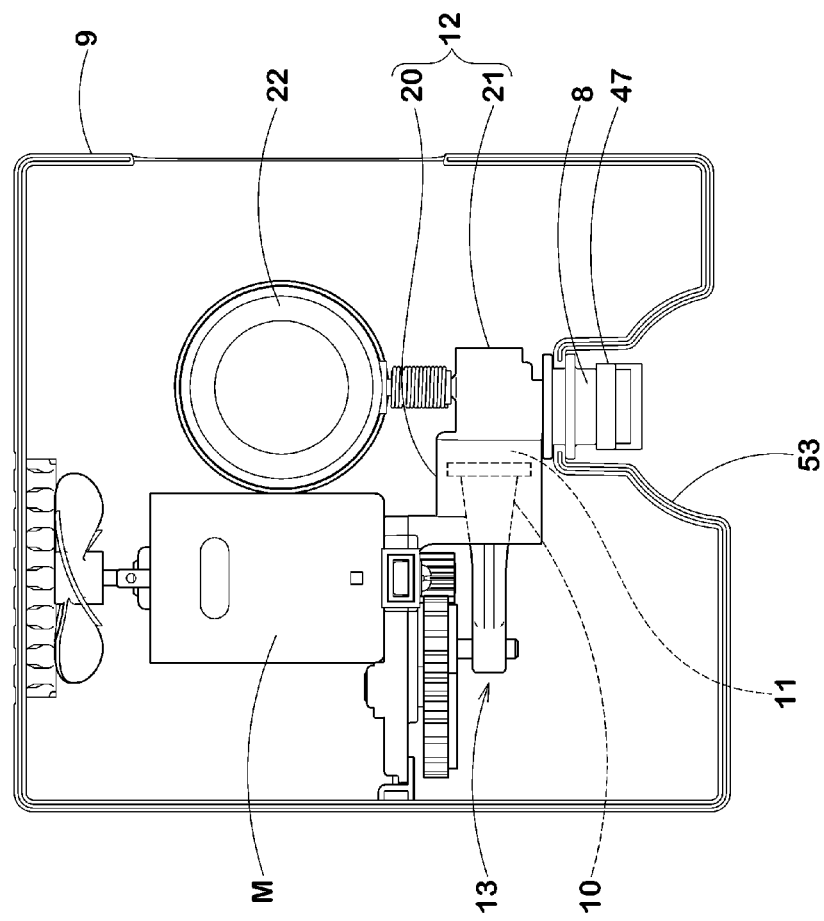
FIG. 3 A cross-sectional view showing its inside structure.

As shown in FIG. 3, the above-mentioned compressor device 2 contains in the housing 9 at least a motor M, and a compressor main body 13 comprising a cylinder 12 forming a pump chamber 11 between the motor and the piston 10 connected to the motor M As shown in FIGS. 1 and 2, the above-mentioned housing 9 is formed as a shape of flat rectangular box with a low height substantially cuboid boxing which has a peripheral wall having four sides surrounded by a side panel 14a, and an upper side panel 14U and a lower side panel 14L closing the upper end and lower end of the peripheral wall respectively. The housing 9 is formed in upper and lower case portion decomposable.

For the above-mentioned motor M, a commercial-release various DC motor powered by an automobile 12 V direct-current power supply can be used. To this motor M, a power-supply cord provided at its tip with a plug for power supply 15 which is connectable to an automobile cigar lighter socket is connected via an on-off switch SW attached to the upper side panel 14U of the above-mentioned housing 9. The plug for power supply 15 is contained in a recess (not shown) disposed in the above-mentioned lower side panel 14L in being able to remove freely.

Figure 4:
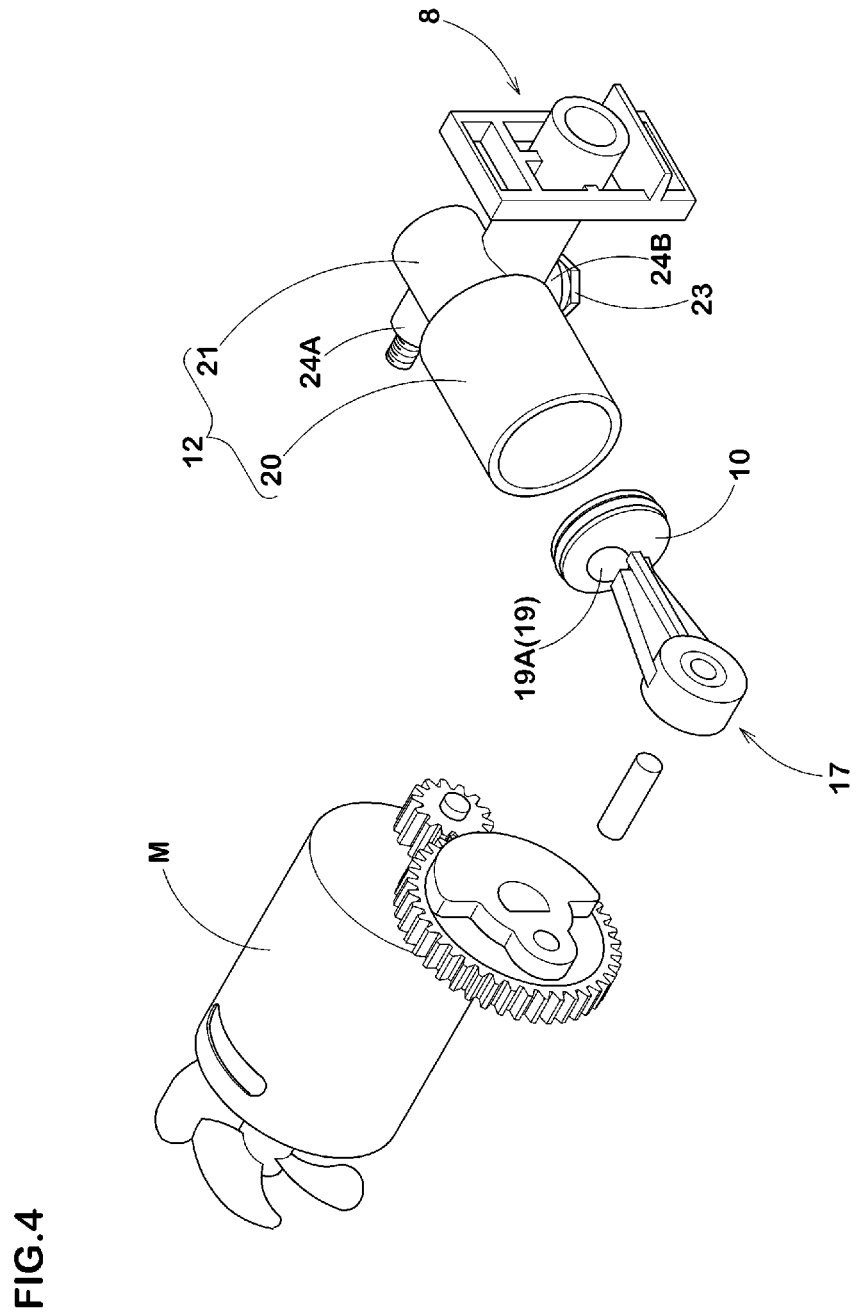
FIG. 4 A exploded perspective view showing a compressor main body.
Figure 5:
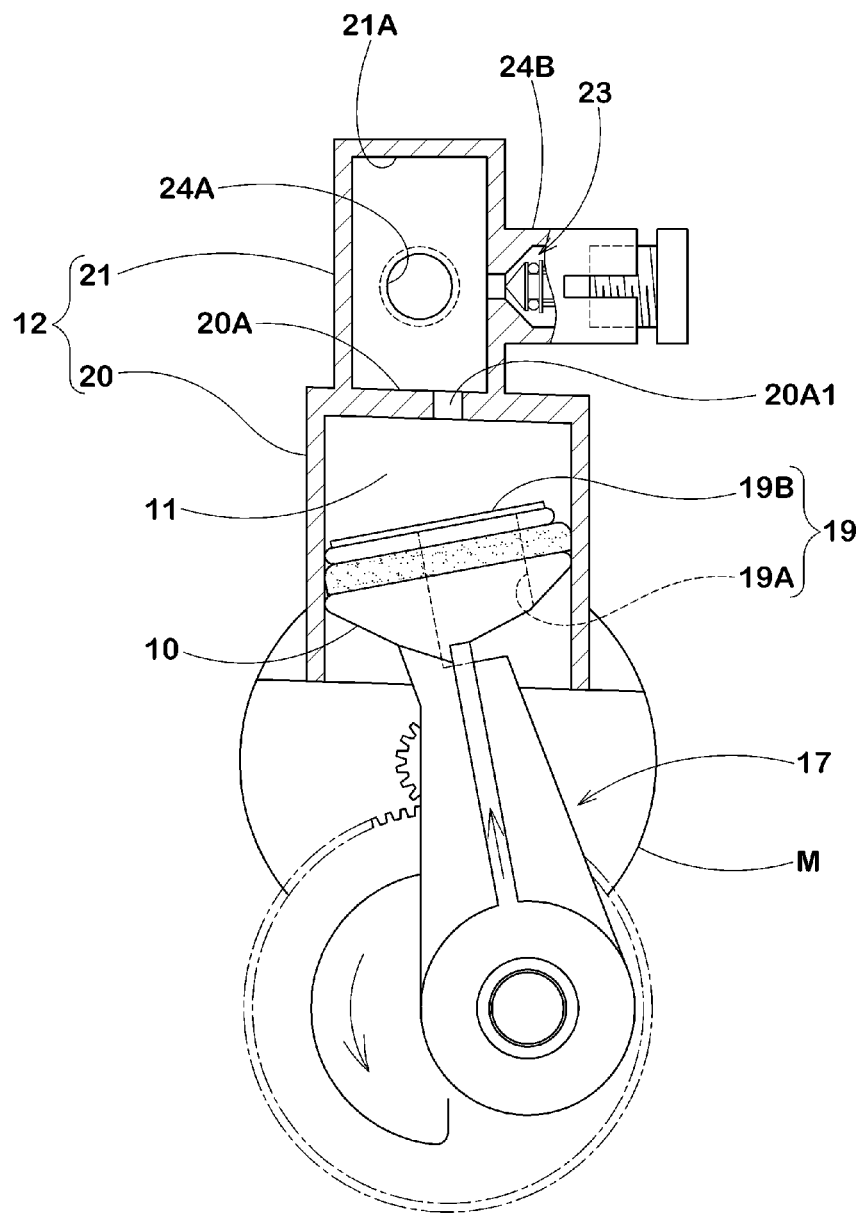
FIG. 5 A partial cross sectional view showing the main part thereof.

The above-mentioned compressor main body 13 comprises, as shown in FIGS. 4 and 5, a piston 10 connected to the above-mentioned motor M via a crank mechanism 17, and a cylinder 12 enclosing reciprocatingly this piston 10 and forming a pump chamber 11 to compress the air between this cylinder and the piston 10. The piston 10 comprises an air intake valve 19 comprising an air intake hole 19A extending through this piston 10 in the direction of the shaft center, and a valve 19B closing this air intake hole 19A from the pump chamber side in spring property manner and formed of elastomer such as rubber, synthetic resin, metal and the like, for example.

In the present embodiment, the above-mentioned cylinder 12 is integrally provided with a cylinder subpart 21 to form a surge tank chamber 21A on a rear end side of the cylinder main body 20 forming the above-mentioned pump chamber 11 so as to retain the compressed air from the pump chamber 11 and reduce a dampen pulsation of pressure caused by the piston 10. In the present embodiment, the surge tank chamber 21A conducts to the pump chamber 11 via a small hole 20A1 formed in a partition wall 20A closing the rear end of the cylinder main body 20.

And in a peripheral wall of the above-mentioned cylinder subpart 21, a compressed air discharge port 8 is arranged in a protruding condition to discharge the compressed air. In the present embodiment, in the peripheral wall of the cylinder subpart 21, a first joining section 24A to attach a manometer 22 and a second joining section 24B to attach a relief valve 23 are provided in protruding conditions in a different orientation from each other.

Figure 6:
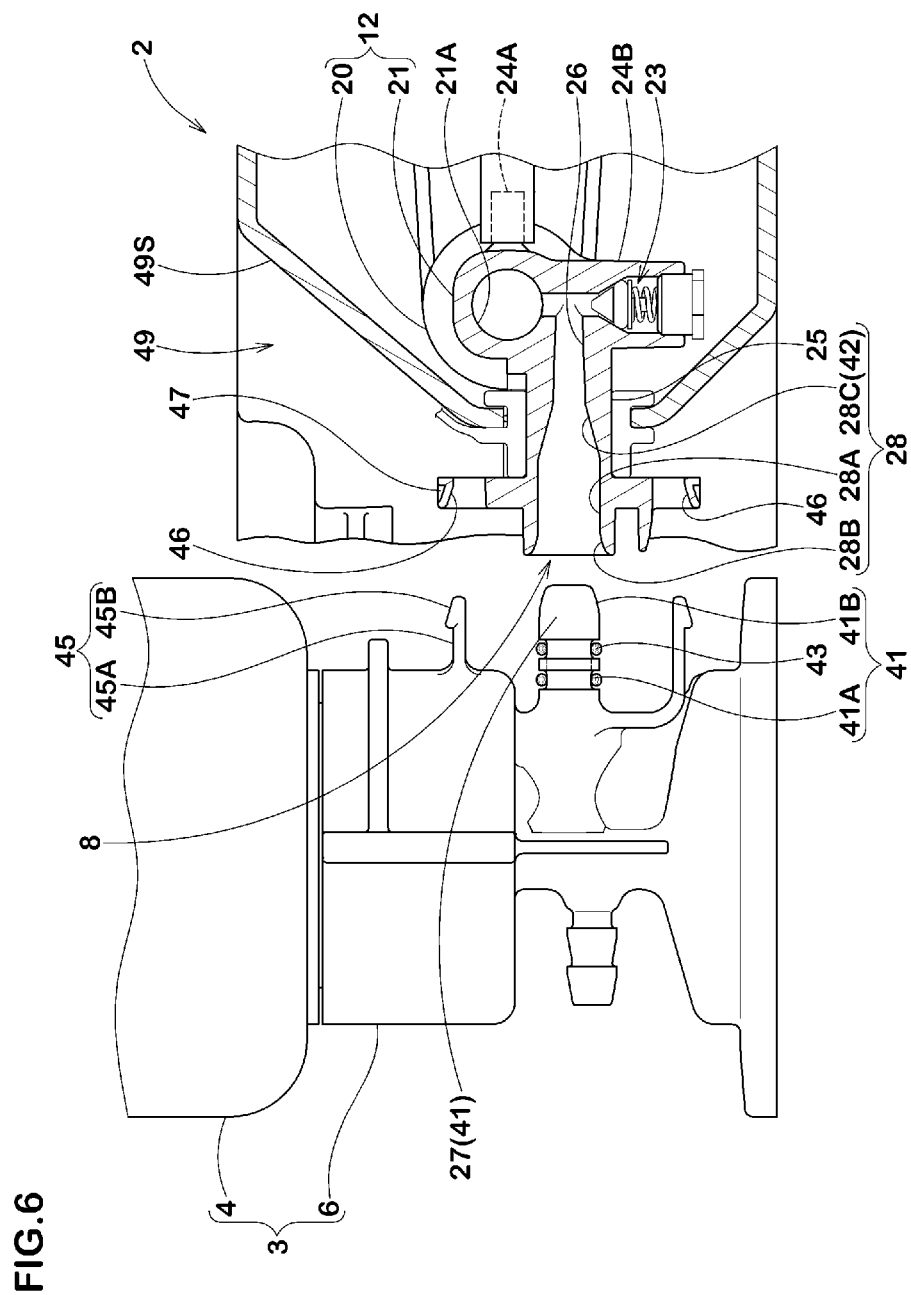
FIG. 6 A cross-sectional view showing a previous state of connecting between a compressed air discharge port and an air intake port.

As shown in FIG. 6, the above-mentioned compressed air discharge port 8 is provided with a cylindrical portion 25 protruding from the above-mentioned cylinder subpart 21 toward the first side panel 14a1. In the inside thereof, a discharge flow passage 26 extending from the above-mentioned surge tank chamber 21A is formed. And the discharge flow passage 26 is provided on an opening end side with a joint concave portion 28 connected to an air intake port 27 disposed in the above-mentioned bottle unit 3. This joint concave portion 28 is continuously provided on the front and back of the parallel hole part 28A having a constant inside diameter with a forward tapered surface 28B and a backward tapered surface 28C forming a tapered cone-shape toward the cylinder subpart 21.

The above-mentioned bottle unit 3 comprises the bottle container 4 containing the puncture sealing agent and the cap 6 attached to its opening 5. The bottle unit 3 is directly connected with the above-mentioned compressor device 2 in the inverted state that the cap 6 is positioned inferiorly.

Figure 8:
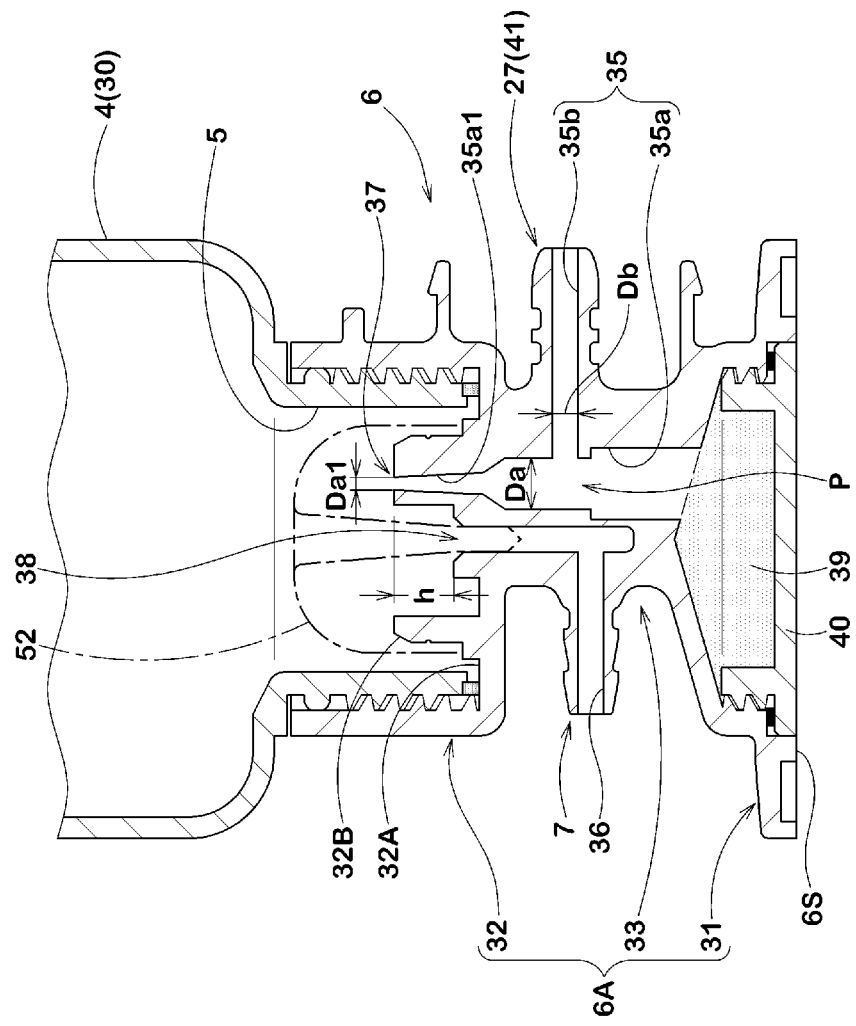
FIG. 8 A cross-sectional view showing a cap with the bottle container.
Figure 9:
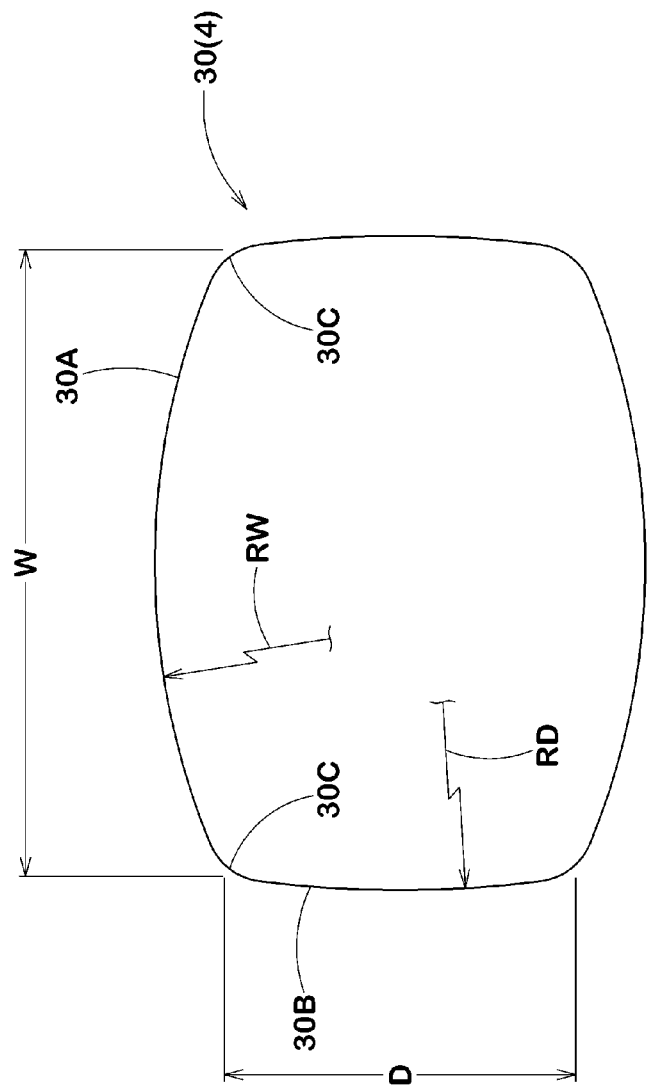
FIG. 9 A side cross-sectional view of a body of the bottle container.

In the above-mentioned bottle container 4, as shown in FIG. 8, the small-diameter cylindrical opening 5 protrudes at a lower end of the trunk portion 30 to move the puncture sealing agent in and out. In the present embodiment as shown in FIG. 9, a cross-section perpendicular to the height direction of the trunk portion 30 is formed as a substantially rectangle surrounding the four sides with a pair of long side parts 30A convexing in arc-like fashion toward an outside of the bottle, and a pair of short side parts 30B convexing in arc-like fashion.

Thus, when
a length of the long side part 30A is defined as W,
a radius of curvature of the long side part 30A is defined as RW,
a length of the short side part 30B is defined as D, and
a radius of curvature of the short side part 30B is defined as RD in the present embodiment, they meet the following relations (1) to (3):

$$1.3 \leq W/D \leq 1.7 \quad (1)$$

$$0.5 \leq RW/W \leq 3.0 \quad (2)$$

$$0.5 \leq RD/D \leq 20.0 \quad (3)$$

In view of the storage behavior of the puncture repair kit 1 in the car, more particularly in a trunk of the car for example, the above-mentioned compressor device 2 is substantially cuboid so that the trunk portion 30 of the bottle container 4 is preferably formed in a substantially cuboid shape. However, a high inner pressure of nearly 350 kPa, for example, exerts through the bottle container 4 at a time of puncture repairing. At this time, in the case that the trunk portion 30 has a round cross-sectional, the trunk portion 30 is inflated evenly in the radial direction by an internal pressure. Therefore, a deformation at a time of compressing air filling is not aware, and it causes a user's less uneasiness. However, in the case that the trunk portion 30 is a rectangle cross-sectional, the inflation caused by the internal pressure is not even, and it is inflated so as to become from a rectangle cross-sectional shape to a round cross-sectional shape. Then the user feels like that its deformation amount is more largely than in reality. Therefore, even if it is within the range of pressure resistance, there is a possibility to cause the user's uneasiness of burst and the like.

In the present embodiment, the above-mentioned long side part 30A and the short side part 30B are formed as convex arc shapes respectively so as to have a nearly deformed shape at the time of inflated state. Therefore, it is possible that the deformation at the time of inflated state is not really felt by the user while improving the storage behavior, and the uneasiness of the user can be kept low.

In consequence of tests of the inventor of the present invention, it is important to inhibit a volume of inflating on a longer side in order to inhibit the above-mentioned uneasiness. To achieve this, the long side length w is preferably set to be large, and the radius of curvature RW is preferably set become small. When the ratio W/D is less than 1.3, or when the ratio RW/W is over 3.0, the above-mentioned length w relatively becomes small, or an increase of inflation volume of the long side length since the radius of curvature RW becomes large. When the above-mentioned ratio W/D is over 1.7, or when the ratio RW/W is less than 0.5, the storage behavior becomes deteriorated. And, when the ratio RD/D is over 20.0, the inflation volume of the short side length increases, and the deformation at the time of compressing air filling becomes large. However, when the ratio RD/D is less than 0.5, the storage behavior deteriorates. Based on this standpoint, the lower limit of the ratio W/D is preferably not less than 1.4, and the upper limit is preferably not more than 1.6. The lower limit of the ratio RW/W is preferably not less than 0.7, and the upper limit is preferably not more than 2.0. The lower limit of the radio RD/D is preferably not less than 1.0, and the upper limit thereof is preferably not more than 10.0.

Incidentally, to stress concentration and to improve the pressure resistance, it is preferable to form a corner portion where the long side part 30A and the short side part 30B intersect as an arc 30C having a radius of curvature of 15 mm±5 mm.

As shown in FIG. 8, the above-mentioned cap 6 comprises the air intake port 27 sending the compressed air from the above-mentioned compressed air discharge port 8 into the bottle container 4, and the sealing agent/compressed air removal port 7 to bring out in succession the puncture sealing agent and the compressed air from the bottle container 4 by sending this compressed air.

More particularly, the above-mentioned cap 6 comprises a cap main portion 6A comprising integrally a basal panel 31 forming a basal plane 6S, a bottle attaching part 32 to attach the opening 5 of the above-mentioned bottle container 4, and a waist part 33 disposed therebetween. And, in this cap main portion 6A, formed are an extending airflow passage 35 extending from the above-mentioned air intake port 27 into the opening 5 of the bottle container 4, and a sealing agent/compressed air removal flow passage 36 extending from the sealing agent/compressed air removal port 7 into the opening 5 of the bottle container 4.

The above-mentioned bottle attaching part 32 comprises an attaching concave part 32A to fix the above-mentioned opening 5, and a boss portion 32B rising from a basal plane of this attaching concave part 32A. Incidentally, the attaching concave part 32A is capable of helically attaching the opening 5 with an inside screw provided in its side wall face. And, a top surface of the above-mentioned boss portion 32B is provided with an air flow passage upper opening 37 where a top end of the above-mentioned air flow passage 35 opens, and with a sealing agent/compressed air removal flow passage upper opening 38 where a top end of the sealing agent/compressed air removal flow passage 36 opens.

The above-mentioned air flow passage 35 comprises a vertical air flow passage 35a extending inferiorly from the above-mentioned air flow passage upper opening 37 and a horizontal air flow passage 35b intersecting with this vertical air flow passage 35a at right angle at an intersection point P and extending from the intersection point P to the air intake port 27. In a lower end part beyond inferiorly the intersection point P of the vertical air flow passage 35a, in case the puncture sealing agent flows backward from the air flow passage upper opening 37, there is a sealing agent container 39 for taking in the flowing backward puncture sealing agent. The sealing agent container 39 has a larger diameter than the vertical air flow passage 35a.

In the puncture repairing, the user first of all infuses a punctured tire T with the puncture sealing agent and compressed air in succession by use of the puncture repair kit 1 and pumps up the tire. Then, the user takes once the puncture repair kit 1, which is disengaged from the tire T and in which the compressor device 2 and the bottle unit 3 have been connected, onto his/her car and runs the car during about ten minutes in order to seal the puncture hole. Finally, the puncture repair kit 1 is connected again to the tire T to check and to refill the air pressure. This will complete the puncture repairing. In this puncture repairing process, the bottle unit 3 after sealing agents filled up leans toward various directions and is vibrated. It is possible that the puncture sealing agent remaining in this bottle unit 3 flows backward from the air flow passage upper opening 37 to the compressor device 2, and that the compressor device 2 is damaged. Upon this, to prevent flowing backward the puncture sealing agent into the compressor device 2, there is the above-mentioned sealing agent container 39. Therefore, an adequate content of the sealing agent container 39 is about the same quantity of sealing agent remaining inside the bottle unit 3; that is it ranges between 5 and 15 cc in the present embodiment. Incidentally, when the content is less than 5 cc, it is possible to fail to contain the flown backward sealing agent. The quantity of over 15 cc goes to waste, and this causes the cap 6 to grow in size unnecessarily, that is, to deteriorate the storage behavior.

To prevent the above-mentioned flowing backward from the airflow passage upper opening 37, it is preferable that the above-mentioned vertical air flow passage 35$a$ is provided on its upper end side with a squeezing part 35$a$1 for reducing the inside diameter so as to reduce an inside diameter Da1 of the air flow passage upper opening 37 into a range between 1.0 and 2.0 mm. At the position of the above-mentioned intersection point P, an inside diameter Da of the vertical air flow passage 35$a$ is set to be larger than an inside diameter Db of the horizontal air flow passage 35$b$; and this improves a suppressive effect of flowing from the vertical air flow passage 35$a$ into the horizontal air flow passage 35$b$. In the present embodiment, the inside diameter Db of the horizontal airflow passage 35$b$ is about from 3.0 to 5.0 mm. It is also preferable to open this air flow passage upper opening 37 above the sealing agent/compressed air removal flow passage upper opening 38 in order to inhibit the flowing backward from the air flow passage upper opening 37; and in particular, a height (h) of the air flow passage upper opening 37 measured from the sealing agent/compressed air removal flow passage upper opening 38 is preferably from 5.0 to 7.0 mm.

The above-mentioned sealing agent container 39 opens in the basal plane 65 of the above-mentioned cap 6, and this opening is closed by a container portion cover 40 being flash with the basal plane 65.

The above-mentioned air intake port 27 comprises a connecting nozzle 41 protruding from the above-mentioned waist part 33 toward the above-mentioned compressed air discharge port 8. Thus, since this connecting nozzle 41 engages with the above-mentioned joint concave portion 28, the compressed air discharge port 8 and the air intake port 27 can be directly connected.

Figure 7:
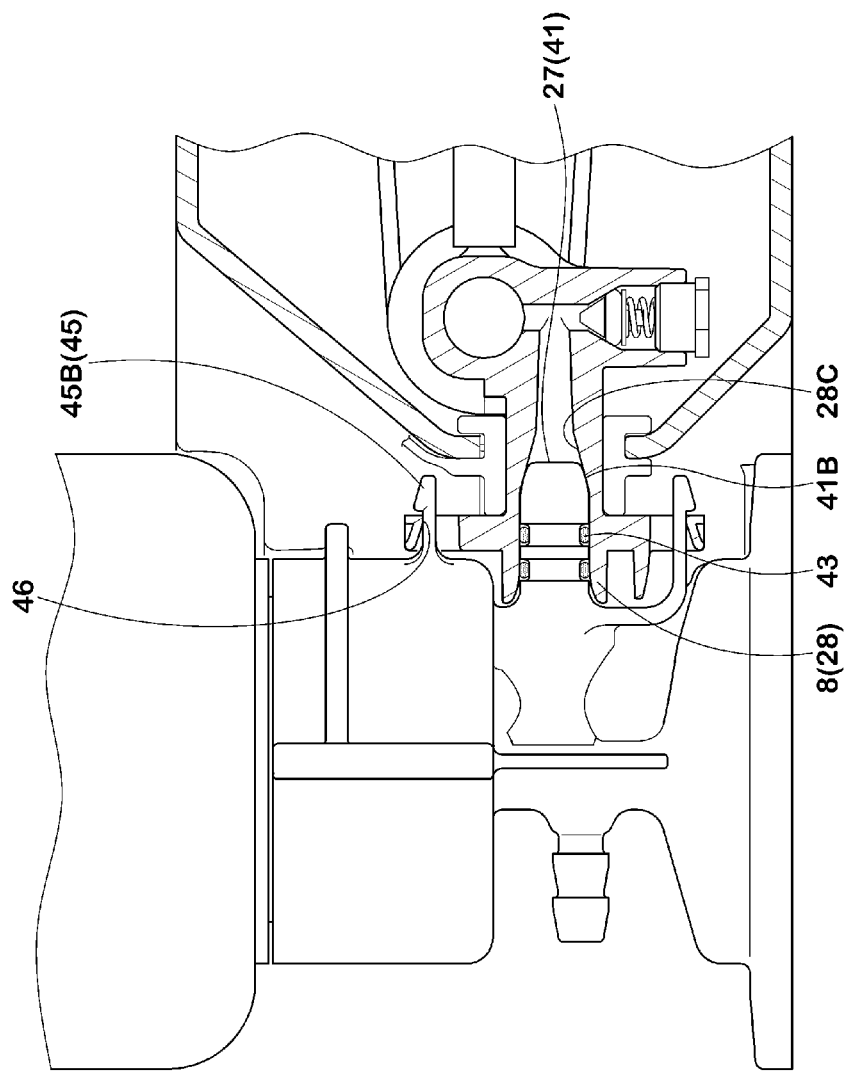
FIG. 7 A cross-sectional view showing the state of connecting between the compressed air discharge port and the air intake port.

As shown in FIGS. 6 and 7, the above-mentioned connecting nozzle 41 is provided with a tapered surface 41B having a tapered cone-shape on a tip end side of the nozzle main body 41A having a constant outer diameter. This s tapered surface 41B is inclined as substantially same as the rear tapered surface 28C of the above-mentioned joint concave portion 28. Therefore, the rear tapered surface 28C forms a nozzle receiving surface portion 42 abutting on the tapered surface 41B and receiving the tapered surface 41B when letting the connecting nozzle 41 into the joint concave portion 28. This will allow the connecting nozzle 41 to connect directly with the joint concave portion 28 at a concentrical and exact position. Incidentally, the front tapered surface 28B of the joint concave portion 28 works as a guide to let into the connecting nozzle 41.

The above-mentioned connecting nozzle 41 is provided around the above-mentioned nozzle main body 41A with an O-shaped ring 43 sealing between the connecting nozzle and an inner surface of the above-mentioned joint concave portion 28 (in the present embodiment, an inner surface of the parallel hole part 28A). In the present embodiment, two of the O-shaped rings 43 for ensuring sealing are arranged as an example. The O-shaped rings 43, consumable supplies, are arranged on the bottle unit 3; this helps to use repeatedly the compressor device 2 without maintenance.

The puncture repair kit 1 according to the present embodiment is provided with a securing device 34 to prevent defacement of its environment by the puncture sealing agent because of disconnection between the above-mentioned compressed air discharge port 8 and the air intake port 27 under repairing the punctured tire.

This securing device 34 comprises a locking device 34A disposed in the above-mentioned cap 6 and a fall-out prevention device 34B formed in the above-mentioned compressor device 2. In the present embodiment, the above-mentioned locking device 34A comprises a pair of locking click 45 protruding on the both (in the present embodiment, upper and lower) sides of the connecting nozzle 41 of the above-mentioned air intake port 27 toward the compressor device 2. In the present embodiment, the fall-out prevention device 34B comprises a click interlocking hole 46 disposed at a position facing to the locking click 45 and being capable of preventing from falling-off by interlocking with the locking click 45.

The above-mentioned locking click 45 is provided at a tip of the main part 45A extending in parallel to the connecting nozzle 41 from the above-mentioned cap main portion 6A with a hooking part 45B having a rectangular triangle shape. Thus, the above-mentioned click interlocking hole 46 interlocks with the hooking part 45B.

The locking click 45 and the cap main portion 6A are formed as an integrally formed body comprising plastic such as nylon, polypropylene, polyethylene and the like, for example, or reinforced plastic containing those and short fiber such as fiberglass and the like. In the present embodiment, the above-mentioned click interlocking hole 46 comprises a frame 47 supported by the above-mentioned cylindrical portion 25 forming the above-mentioned joint concave portion 28. This frame 47, the cylindrical portion 25, and the cylinder 12 are formed as an integrally formed body made of light weight alloy such as zinc alloy, aluminum alloy and the like, for example.

Figure 10:
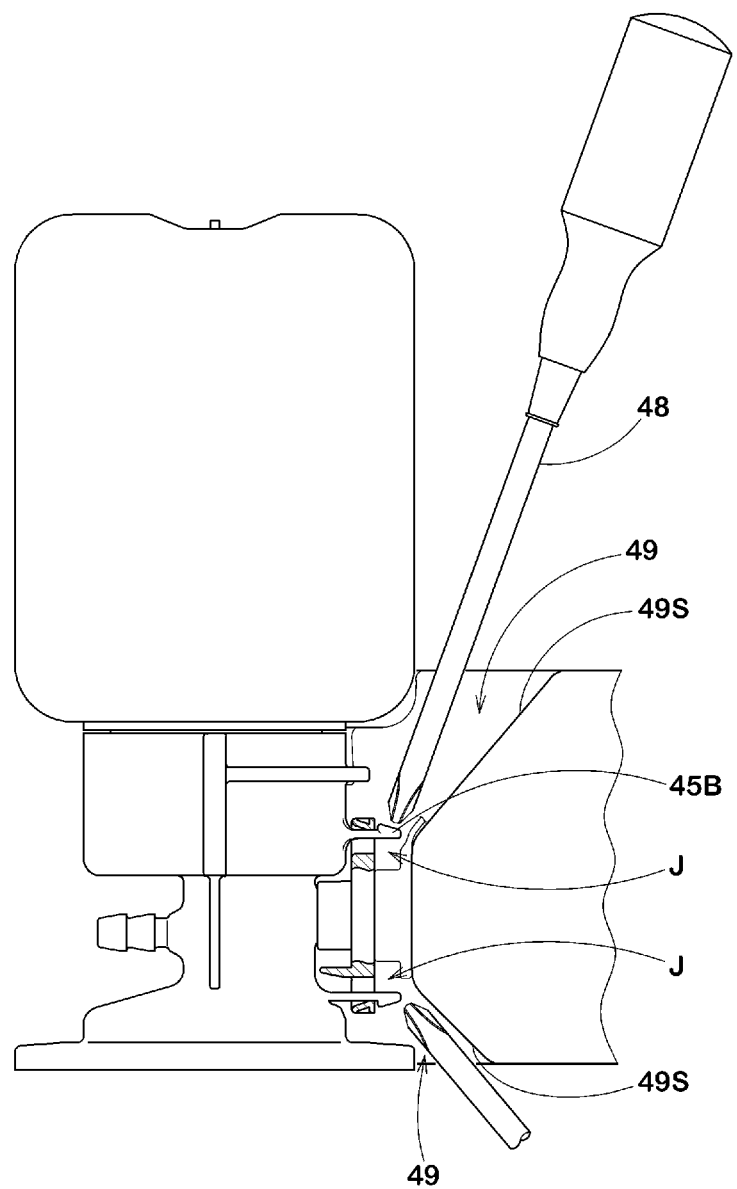
FIG. 10 A cross-sectional view showing a guide groove and its function.

In the present embodiment, as shown in FIGS. 2 and 10, the above-mentioned compressor device 2 is provided in the above-mentioned housing 9 with a guide groove 49 for leading a rod-like jig 48 such as a screw driver, for example, into an interlocking part J between the above-mentioned locking click 45 and the click interlocking hole 46 so as to release the interlocking. This guide groove 49 is an inclined groove having a groove basement 49S inclined toward the interlocking part J as a guide surface. The guide groove 49 can lead the rod-like jig 48 into interlocking part J between the groove basement 49S and the groove-sidewall faces on its both sides. The above-mentioned locking click 45 comprises outwardly the above-mentioned hooking part 45B, and the above-mentioned interlocking can be easily released with pushing inwardly the hooking part 45B by the rod-like jig 48.

Owing to the pushing of the compressor device 2 of the bottle unit 3, a direct connection between the above-mentioned compressed air discharge port 8 (in the present embodiment, joint concave portion 28) and the air intake port 27 (in the present embodiment, connecting nozzle 41), and an interlocking between the above-mentioned locking click 45 and the click interlocking hole 46 are simultaneously achieved. At this time, the pushing power is preferably in a range between 2 and 10 kgf. When the pushing power is over 10 kgf, the operability enormously will decrease; and when it is less than 2 kgf, the fixation will be weak, and it may cause a disconnection owing to the internal pressure at a time of inflating the tire.

Consequently, in the puncture repair kit 1 according to the present embodiment, the compressor device 2 and the bottle unit 3 are directly connected without any hoses intervention. And, in this connected state, the both of them are fixed by the locking click 45 and the click interlocking hole 46 with each other. Therefore, the bottle unit 3 can become integral with the compressor device 2 so as to lower the center of gravity point, and the stability can be improved. Moreover, the bottle unit 3 becomes not to be connected with the air supply hose from the compressor device 2, and not to be pushed by the air supply hose; and the bottle falling can effectively prevent. At this time, in the above-mentioned directly connecting state, the basal plane 6s of the above-mentioned cap 6 preferably and the basal plane 2s of the compressor device 2 are flush with each other. This makes the ground contacting area increased, and it can increase the friction force of the road surface at the compressor operating time, it can improve not only the installation stability but also the ground contacting vibration stability.

Figure 11:
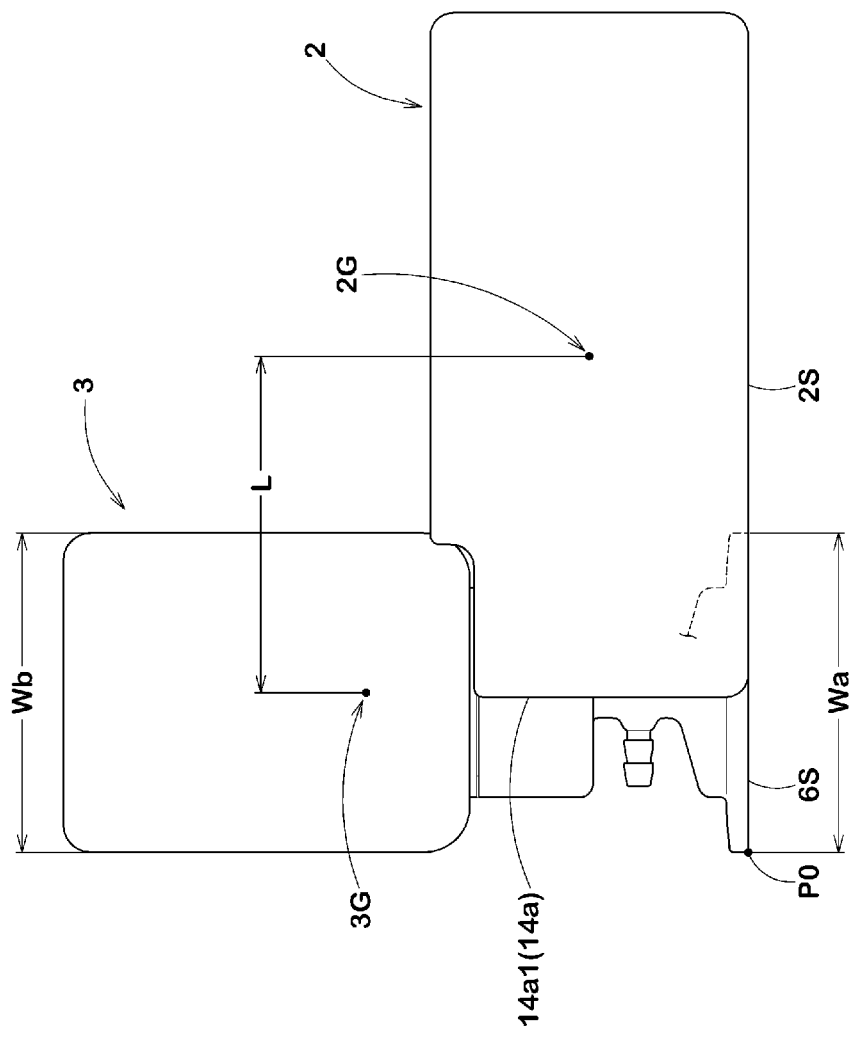
FIG. 11 A side view of a connected state of the compressor device and the bottle unit.

The above-mentioned bottle unit 3 is directly connected on the first side surface of the compressor device 2, in the present embodiment, on the above-mentioned side panel 14a1 side. On this occasion, as shown in FIG. 11, a width Wa of the basal plane 6S of the above-mentioned cap 6 at right angle to the first side surface (in the present embodiment, side panel 14a1) is preferably substantially equivalent to the width Wb of the above-mentioned bottle container 4 in the right-angle direction. In viewpoint of the storage behavior, the width Wa is preferably not more than the width Wb. In contrast, a pivot point PO of a falling of the puncture repair kit 1 is equal to an outer edge point of the basal plane 65 of the cap 6 in the right-angle direction. Therefore, the more outside this pivot point P0 in the right-angle direction is located, the more the falling moment is improved, and the less the puncture repair kit becomes falling down. Therefore, when the width Wa and the width Wb are set to be substantially the same, it becomes possible not to undermine the storage behavior but to improve the fall-prevention efficacy.

As shown in FIG. 2, when the compressor device 2 has a rectangle shape of which a first width W1 is longer than a second width W2, it is preferable to connect the above-mentioned bottle unit 3 on the shorter side panel 14a1 side. Therefore, as shown in FIG. 11, this can increase a distance L between the center of gravity point 2G of the compressor device 2 and the center of gravity point 3G of the bottle unit 3, and the fall moment increases; therefore, the puncture repair kit becomes less falling down.

The above-mentioned first side surface (in the present embodiment, side panel 14a1) of the compressor device 2 is provided with a substantially semicircle concave portion 53 (see FIGS. 2 and 3) that fits an outer surface shape of the above-mentioned bottle unit 3 and stabilizes the seating of the bottle unit 3.

Figure 12A:
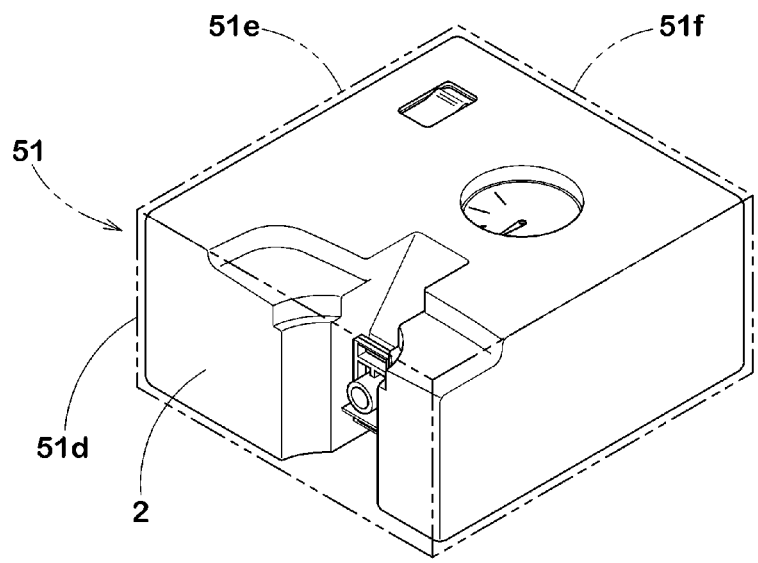
FIGS. 12 (A) and (B): Perspective views showing a circumscribed cuboid of the compressor device and the bottle unit.
Figure 12B:
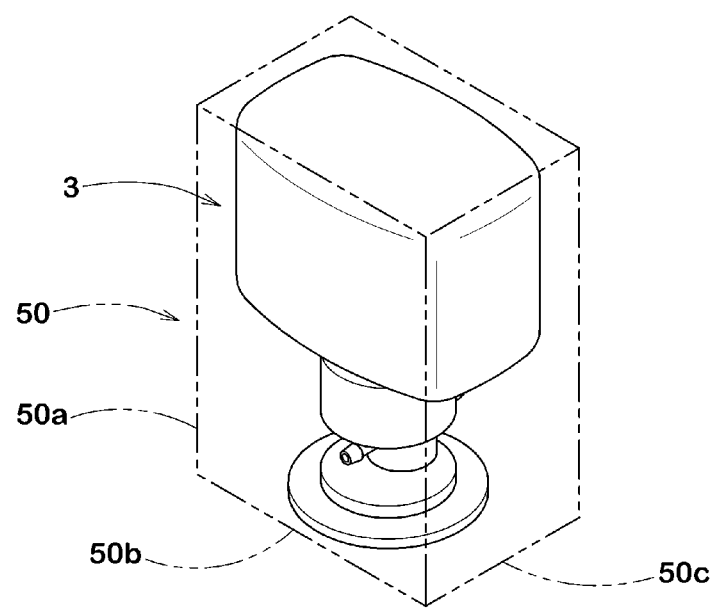

In view of storage behavior, as shown in FIGS. 12(A) and 12(B), in the above-mentioned bottle unit 3,
lengths of two sides among three sides 50a, 50b, and 50c of the bottle-side circumscribed cuboid 50 circumscribed by the surface of this bottle unit 3 and
lengths of two sides among three sides 51d, 51e, and 51f of the compressor-side circumscribed cuboid 51 circumscribed by the surface of the above-mentioned compressor device 2
are preferably of equal length.

Figure 13A:
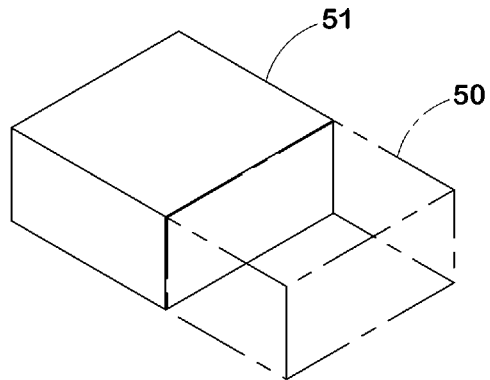
FIGS. 13 (A) to (C): Perspective views explaining their functions.
Figure 13B:
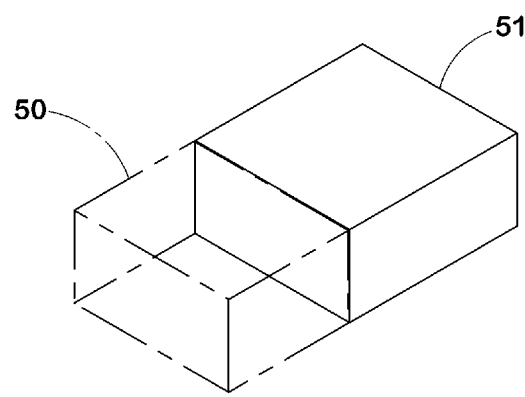
Figure 13C:
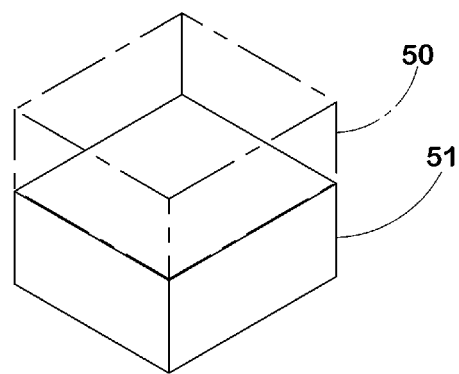

This as shown in FIGS. 13(A) to 13(C), the bottle-side circumscribed cuboid 50 and the compressor-side circumscribed cuboid 51 can be stacked on one another without unevenness so as to cut waste of storage space and to improve the storage behavior in the car.

Figure 14:
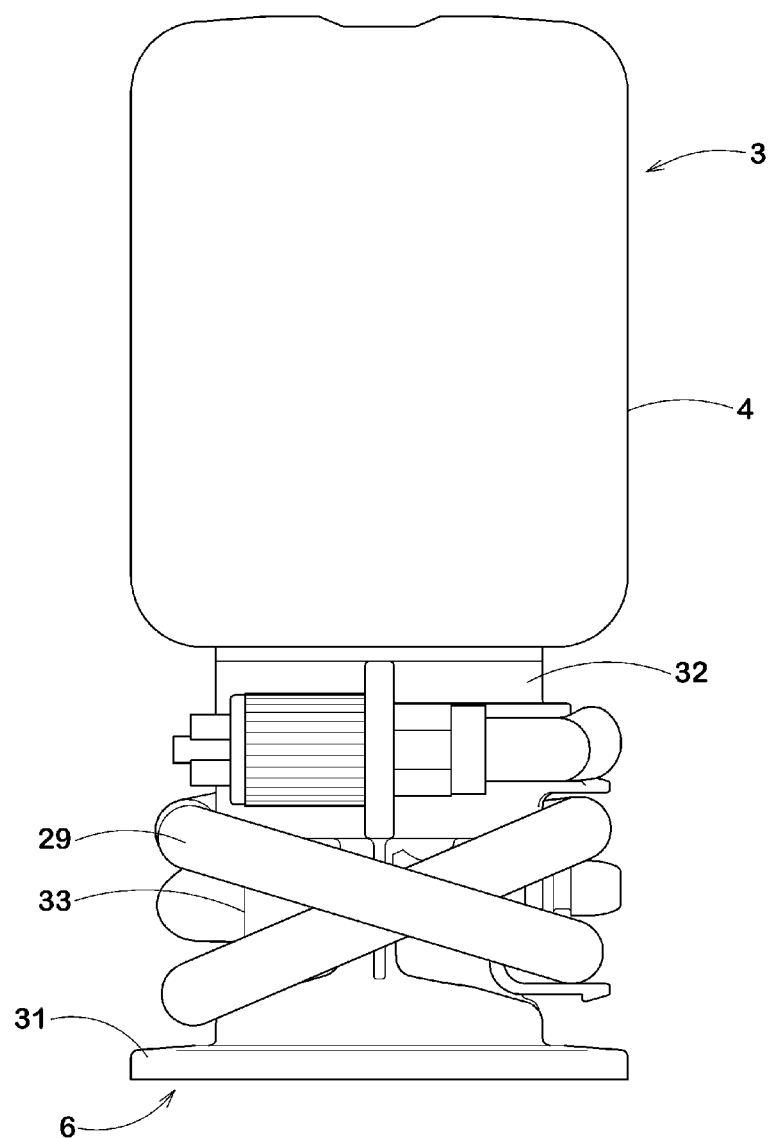
FIG. 14 A side view showing a storage state of a feeding hose.

Incidentally, the above-mentioned sealing agent/compressed air removal port 7 is connected with the above-mentioned feeding hose 29. This s feeding hose 29 is wound to around the above-mentioned waist part 33 for storing in an unoccupied time as shown in FIG. 14.

To prevent from flowing out the puncture sealing agent in the bottle container 4 in the unoccupied time, the bottle unit 3 comprises with an inner stopper 52 which is press-fitted on the boss portion 32B to close the air flow passage upper opening 37 and the sealing agent/compressed air removal flow passage upper opening 38 respectively in the above-mentioned boss portion 32B as shown in dashed-dotted line in FIG. 8. The inner stopper 52 can be released from the boss portion 32B owing to a pressure increase of the compressed air from the compressor device 2.

Figure 15:
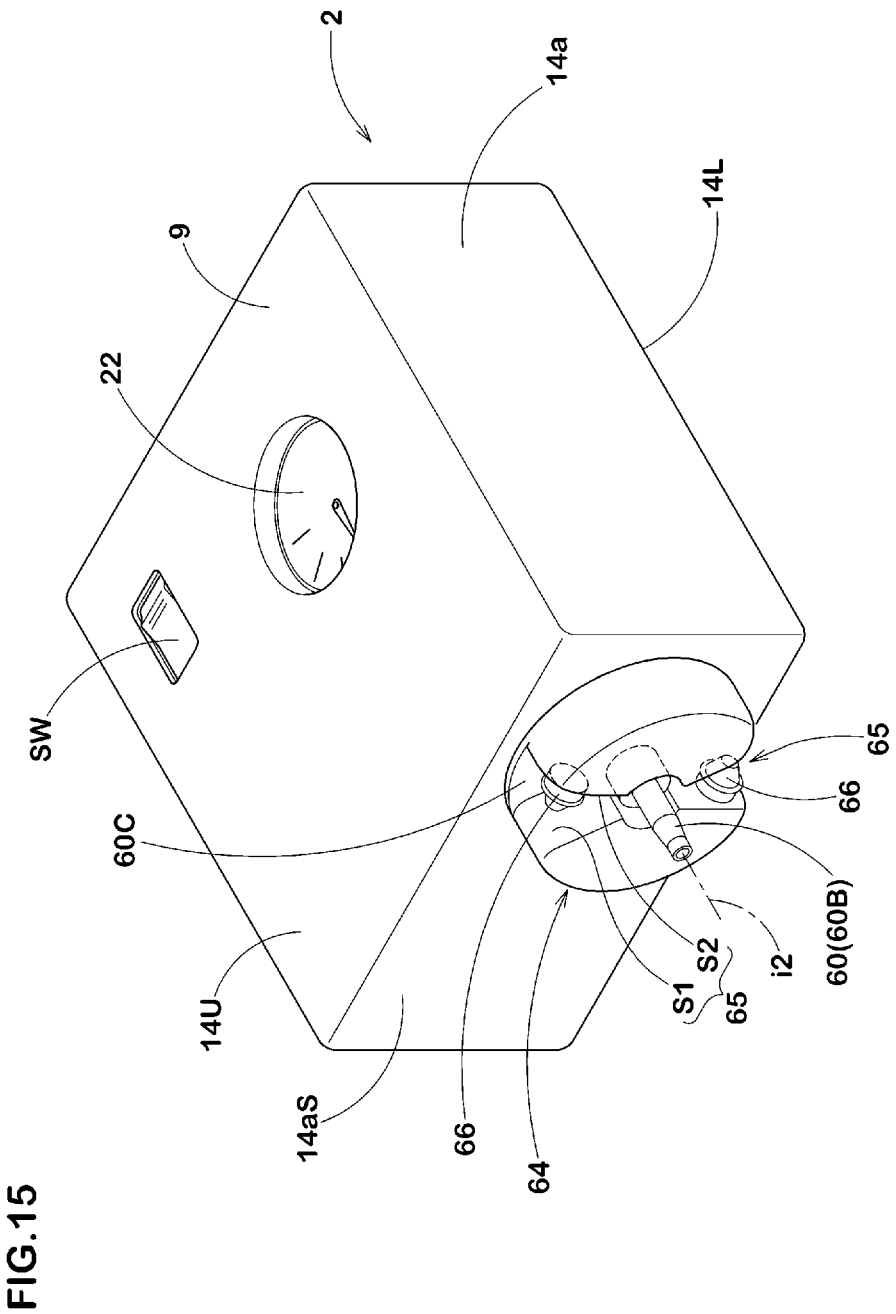
FIG. 15 A perspective view showing a compressor device of the puncture repair kit according to the second embodiment.
Figure 16:
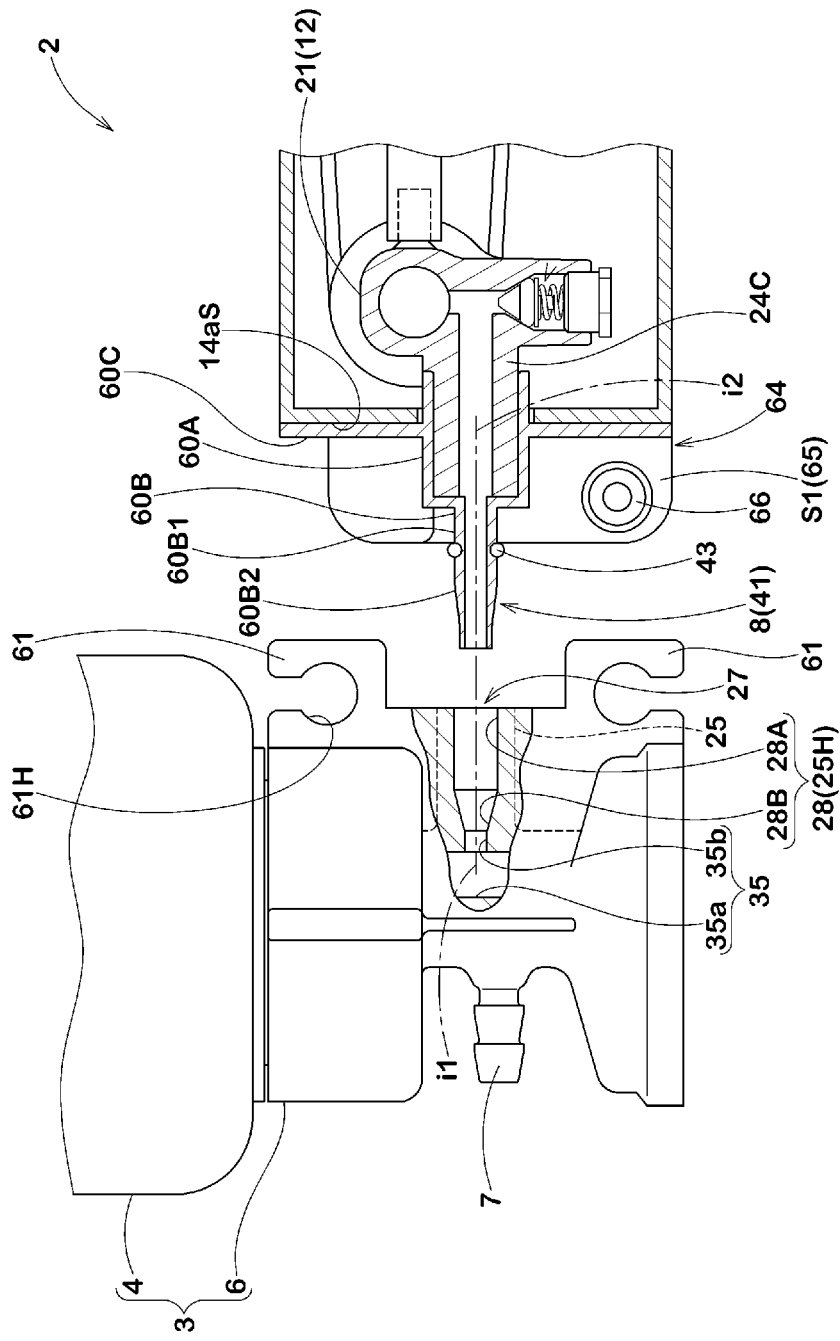
FIG. 16 A cross-sectional view showing a previous state of connecting between a compressed air discharge port and an air intake port.
Figure 17:
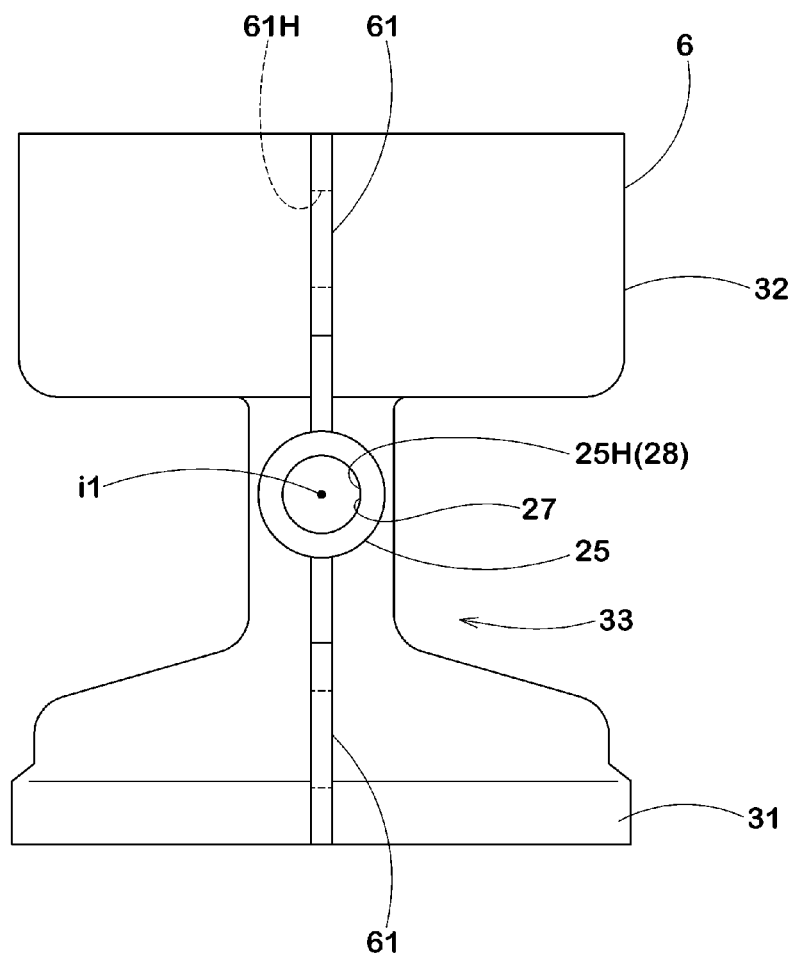
FIG. 17 A front view of a cap.

A second embodiment of the puncture repair kit 1 is shown in FIGS. 15-21. The puncture repair kit 1 according to the second embodiment is as shown in FIG. 16, the above-mentioned compressed air discharge port 8 is defined as the above-mentioned connecting nozzle 41, and the above-mentioned air intake port 27 is defined as the above-mentioned joint concave portion 28, In the present embodiment, the above-mentioned joint concave portion 28 is formed of a central hole 25H of the cylindrical portion 25 protruding toward the above-mentioned connecting nozzle 41. And, the joint concave portion 28 comprises a parallel hole part having the constant inside diameter 28A and the tapered hole part 28B having the tapering cone-shape connecting to its butt end. The joint concave portion 28 is connectable to the connecting nozzle 41 and formed around its shaft center i1 relatively-rotationally.

The above-mentioned cap 6 is provided around the above-mentioned cylindrical portion 25 with a pair of locking plate portion 61 extending radially on both sides of the shaft center i1 of this cylindrical portion 25. In the present embodiment, the locking plate portion 61 is disposed on the top and bottom of the cylindrical portion 25. This locking plate portion 61 is provided with a locking hole 61H in its thickness direction. In the present embodiment, the locking hole 61H is provided with a substantially c-shaped notched part 61A to enable having elastic deformation so that the locking hole 61H has a spring characteristic. The tip end of the shaft center i1 of the locking plate portion 61 is protruded forward over the tip end of the above-mentioned cylindrical portion 25.

The above-mentioned connecting nozzle 41 is provided integrally with a tapered nozzle main part 60B at a tip end of an attaching cylindrical part 60A which is outward jointed to a tubular joining section 24c extending from the above-mentioned cylinder subpart 21, and is disposed on a first side surface 14aS side of the above-mentioned compressor device 2 side in a protruding condition. In the present embodiment, the attaching cylindrical part 60A is provided with a flared part 60C along the first side surface 14aS. This flared part 60C is fixed to the first side surface 14aS, for example, by screwing so as to fix the connecting nozzle 41 integrally to the compressor device 2. The nozzle main part 60B comprises the main part 60B1 having a constant external diameter and the cone-shaped taper part 60B2 connecting to its tip end, and an O-shaped ring 43 is attached around this main part 60B1 to seal between the joint concave portion 28 and the nozzle main part.

Figure 20:
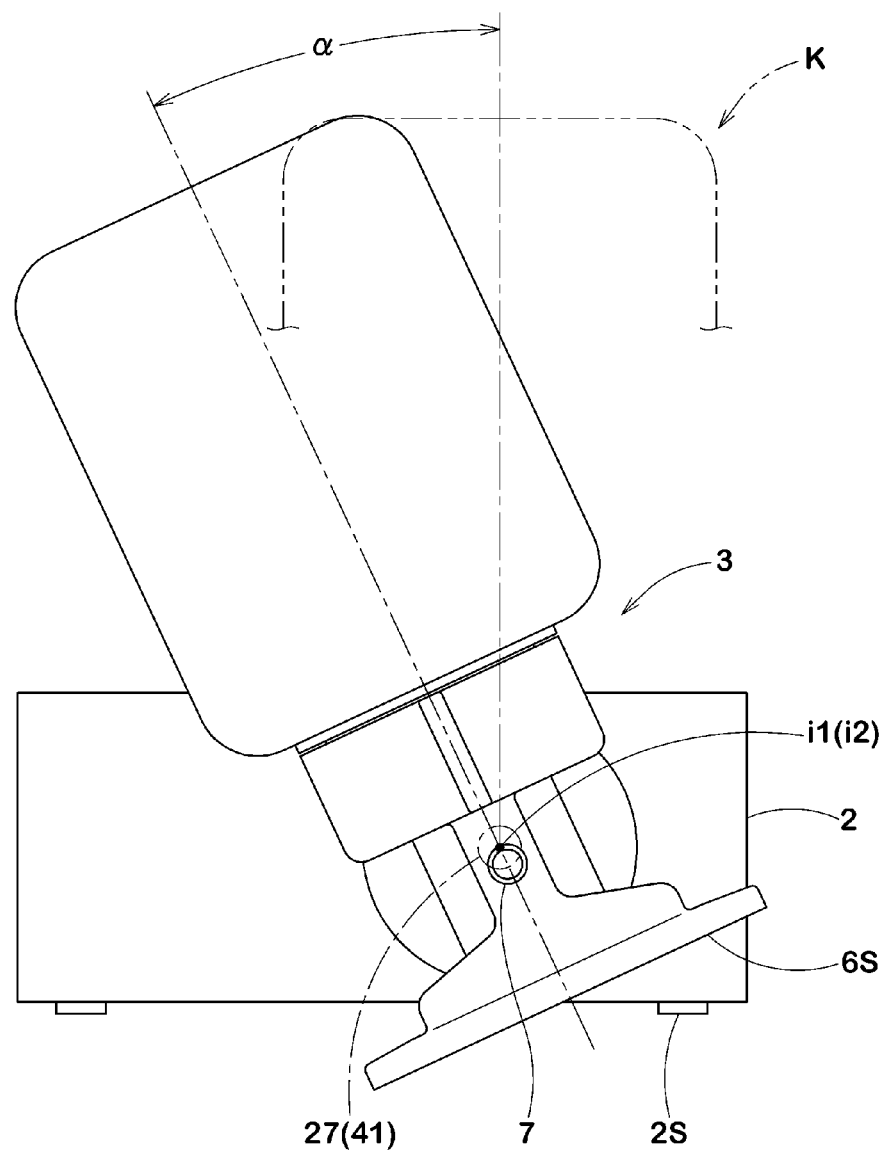
FIG. 20 An explanation drawing of a fall-out prevention work.
Figure 21:
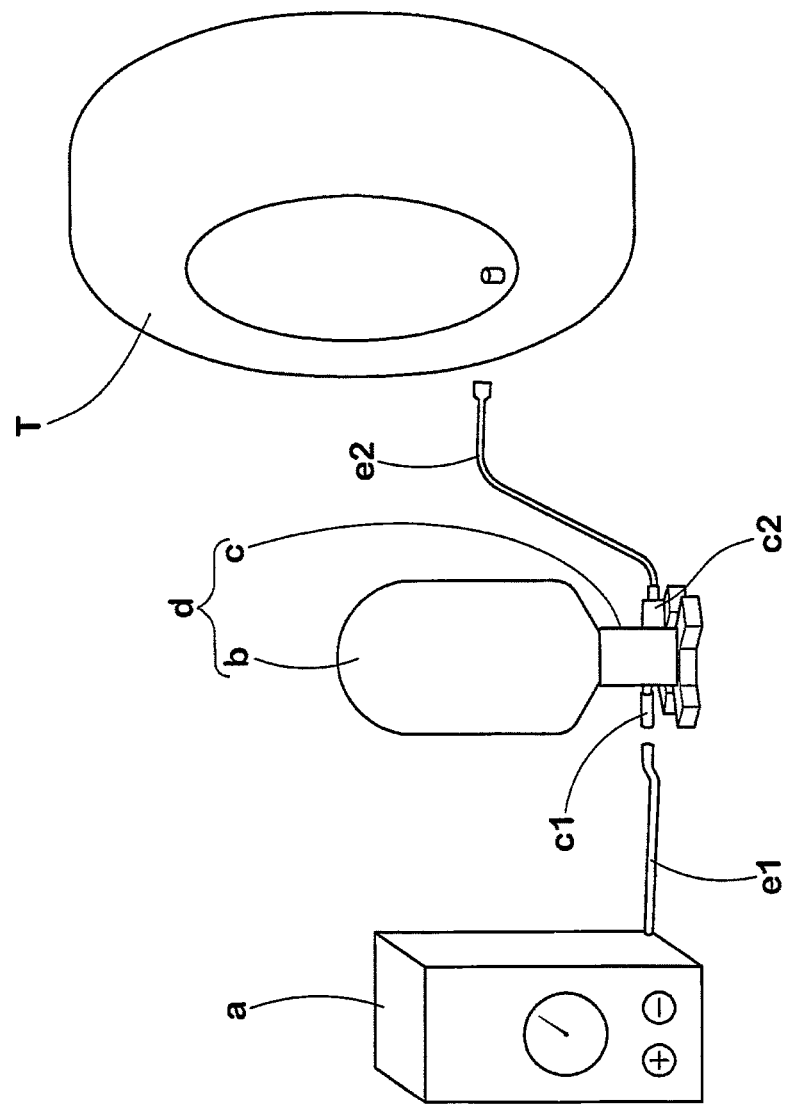
FIG. 21 A perspective view explaining a conventional puncture repair kit.

The above-mentioned compressor device 2 is provided with a fall-out prevention device 64. In this fall-out prevention device 64, the above-mentioned connecting nozzle 41 is put into the joint concave portion 28 so as to joint the connecting nozzle 41 with the joint concave portion 28. And then, as shown in FIG. 20, the above-mentioned bottle unit 3 is relatively rotated around the above-mentioned shaft center i1 with respect to small angle α (alpha). In this, the fall-out prevention device 64 interlocks with the above-mentioned locking hole 61H to prevent from falling-out from the joint concave portion 28 of the above-mentioned connecting nozzle 41.

Figure 18:
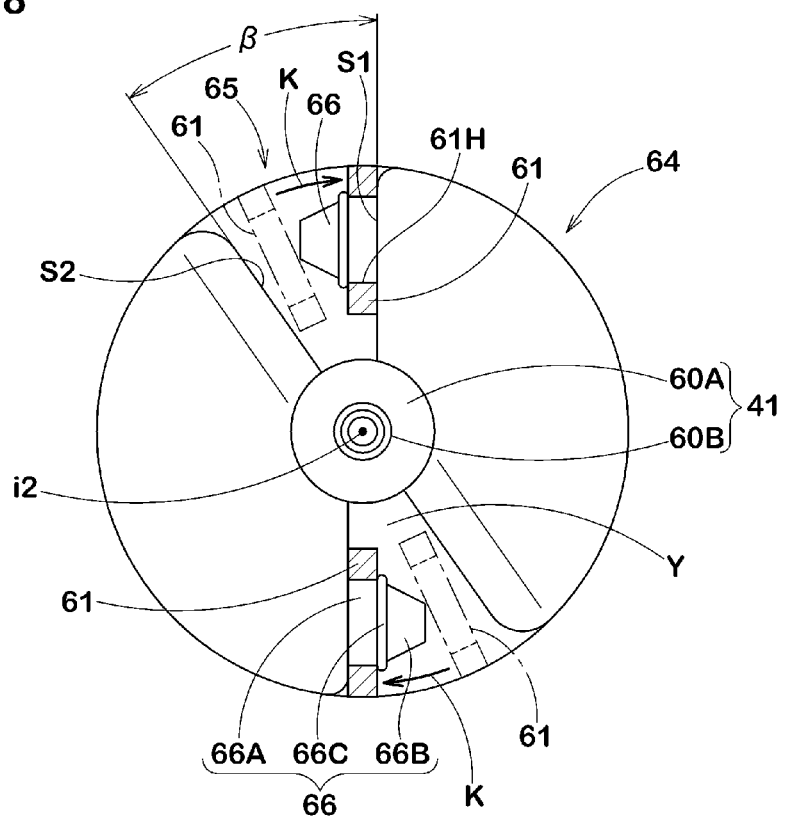
FIG. 18 A front view of a fall-out prevention device.
Figure 19:
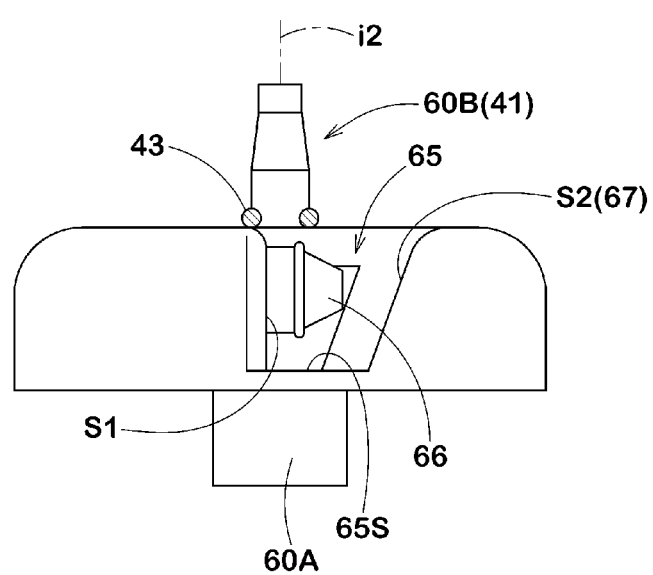
FIG. 19 A side view of the fall-out prevention device.

As shown in FIGS. 15, 18, and 19, the above-mentioned fall-out prevention device 64 is provided with a pair of fan-like insert concave portions 65 comprising the first and second groove side walls S1 and S2 disposed in a radial fashion around the shaft center i2 of the above-mentioned connecting nozzle 41. AS shown in FIG. 18, each of the insert concave portions 65 can introduce the above-mentioned lacking plate portion 61 between the above-mentioned first and second groove side walls S1 and S2

The above-mentioned first groove side wall S1 can abut on the above-mentioned locking plate portion 61 through the above-mentioned relatively rotation K of the bottle unit 3, and a terminate point of the rotation is determined. This first groove side wall S1 is provided in a protruding condition with a secured protrusion 66 to prevent falling-off from the joint concave portion 28 of the above-mentioned connecting nozzle 41 by jointing with the above-mentioned locking hole 61H of the abutted locking plate portion 61.

The above-mentioned secured protrusion 66 is provided with, in the present embodiment, a flange 66C having a somewhat larger diameter than the above-mentioned locking hole 61H between a tapered cone part 66B and a base of a bottle 66A having an external diameter which is constant and substantially the same as that of the locking hole 61H. This flange 66c can pass through the locking hole 61H owing to a spring characteristic of the c-shaped locking hole 61H, and can keep an abutting state between the first groove side wall S1 and the locking plate portion 61 owing to the friction at the time of passing through.

The above-mentioned second groove side wall 52 is formed of a sloping surface 67 inclined in the direction that an interval between the first groove side wall 51 and the second groove side wall decreases toward the basement 65A of the insert concave portion 65. Such a sloping surface 67 can work as an introducing surface to introduce the above-mentioned locking plate portion 61 into the insert concave portion 65.

Consequently, in the above-mentioned the first embodiment, the fall-out prevention work between the above-mentioned connecting nozzle 41 and the joint concave portion 28 is conducted at the same time as the direct connecting; and, in the second embodiment, the fall-out prevention work is conducted after the direct connecting and by relatively rotating the above-mentioned bottle unit 3 with respect to the compressor device 2 around the shaft center i1 at the small angle α (alpha). In the second embodiment, because the fall-out prevention is conducted by a different work from the connecting work, it is possible to make the user check that he/she conducts the fall-out prevention work. Therefore, it is possible to prevent the connecting from coming off caused by forgetting of a fall-out prevention work or conducting an incomplete fall-out prevention work.

Incidentally, in the interlocking state Y between the above-mentioned secured protrusion 66 and the locking hole 65H, it is preferable that the basal plane 2S of the above-mentioned compressor devices 2 and the basal plane 6s of the cap 6 are flush with each other. This help to increase ground contacting area and friction force with a road surface so that not only the installation stability but also vibration stability at a time of compressor vibration can be improved. When the fall-out prevention work is incomplete, the basal planes 2S and 6S are mismatched, and the user can easily know the incomplete fall-out prevention work. Incidentally, the above-mentioned angle α (alpha) of the relative rotation K in the fall-out prevention work is preferably in a range between 10 and 30 degrees. When the angle α (alpha) is not more than 10 degrees, it is difficult to let the user know the incomplete fall-out prevention work. When it is over 30 degrees, it is not easy to conduct the work, and the certainty reduces. It is preferable to set the angle β (beta) between the above-mentioned first and second groove side walls S1 and S2 is in a range between 15 and 35 degrees in order to set the above-mentioned angle α (alpha) ranging between 10 and 30 degrees.

In the present embodiment, to improve the accuracy, the above-mentioned fall-out prevention device 64 and the connecting nozzle 41 are formed as an integrally formed body made of, plastic such as nylon, polypropylene polyethylene and the like, or of reinforced plastic containing short fiber and the like for example. However, the connecting nozzle 41 can also be formed, for example, integrally with the cylinder 12 so as to form separately from the fall-out prevention device 64 upon request.

Although the especially preferred embodiment of the present invention has been described in detail, the invention is not limited to the illustrated embodiment, and various modifications can be made.

The invention claimed is:

1. A puncture repair kit comprising
  a compressor device, and
  a bottle unit comprising a bottle container enclosing puncture sealing agent and a cap attached to an opening of this bottle container;
    characterized in that
  said compressor device comprises a compressed air discharge port to discharge a compressed air;
  said cap comprises an air intake port to intake the compressed air from said compressed air discharge port into the bottle container, and a sealing agent/compressed air removal port to remove in succession the puncture sealing agent and the compressed air from said bottle container by sending this compressed air;
  said compressed air discharge port is formed of a connecting nozzle protruding toward said air intake port, and said air intake port is formed of a joint concave portion fit together with said connecting nozzle, so as to directly connect said compressed air discharge port with said air intake port,
  the joint concave portion is formed of a central hole of a cylindrical portion protruding toward said connecting nozzle;
  the cylindrical portion is proposed around the cylindrical portion with a pair of locking plate portions radially extending on both sides of a shaft center of said joint concave portion and having a locking hole in the thickness direction; and
  the compressor device is provided with a fall-off prevention device to prevent from the connecting nozzle of the joint concave portion by a clicking with the locking hole, said clicking being conducted by rotating said bottle unit around said shaft center at a small angle α with respect to the compressor device after inserting and jointing said connecting nozzle into the join concave portion.

2. The puncture repair kit as set forth in claim 1, characterized in that said compressor device comprising a housing, a motor enclosed in this housing, and a compressor main body comprising a piston connected with the motor via a crank mechanism and a cylinder reciprocatingly enclosing the piston and forming a pump chamber to compress the air between this cylinder and the piston; and said cylinder is provided with said compressed air discharge port integrally.

3. The puncture repair kit as set forth in claim 1, characterized in that said connecting nozzle is provided on a tip end side thereof with a cone-shaped tapered surface, and said joint concave portion is provided with a cone-shaped nozzle receiving surface portion abutting on the tapered surface and receiving the tapered surface.

4. The puncture repair kit as set forth in claim 1, characterized in that said fall-off prevention device is provided with a pair of insert concave portions comprising first and second groove side walls disposed radially around the shaft center of said connecting nozzle and enabling inserting each of said locking plate portions between the first and second groove side walls; and said first groove side wall can abut on said locking plate portion owing to said rotation of the bottle unit, and the first groove side wall is provided with a secured protrusion so as to prevent from falling off from the connecting nozzle of said joint concave portion by jointing with said locking hole of said locking plate portion.

5. The puncture repair kit as set forth in claim 4, characterized in that said second groove side wall is formed of a sloping surface inclined in the direction that an interval between the first groove side wall and the second groove side wall decreases toward the basement of the insert concave portion.

6. The puncture repair kit as set forth in claim 1, characterized in that at a time of interlocking said fall-off prevention device with said locking hole, a basal plane of said compressor device and a basal plane of the cap are flush with each other.

* * * * *